(12) United States Patent
Fujiwara et al.

(10) Patent No.: US 9,028,939 B2
(45) Date of Patent: May 12, 2015

(54) LAMINATED SHEET FOR PACKAGING ELECTRONIC COMPONENT AND MOLDED BODY THEREOF

(75) Inventors: Junpei Fujiwara, Isesaki (JP); Masatoshi Kawata, Isesaki (JP); Yasushi Miyamura, Isesaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 129 days.

(21) Appl. No.: 13/981,223

(22) PCT Filed: Jan. 25, 2012

(86) PCT No.: PCT/JP2012/051499
§ 371 (c)(1),
(2), (4) Date: Jul. 23, 2013

(87) PCT Pub. No.: WO2012/102287
PCT Pub. Date: Aug. 2, 2012

(65) Prior Publication Data
US 2013/0295307 A1    Nov. 7, 2013

(30) Foreign Application Priority Data
Jan. 28, 2011    (JP) .................................. 2011-016640

(51) Int. Cl.
| B32B 1/02 | (2006.01) |
| B32B 1/08 | (2006.01) |
| B32B 25/02 | (2006.01) |
| B32B 27/08 | (2006.01) |
| B32B 27/30 | (2006.01) |
| C08L 51/04 | (2006.01) |
| B32B 7/02 | (2006.01) |
| B32B 25/04 | (2006.01) |
| B32B 25/08 | (2006.01) |
| B32B 25/14 | (2006.01) |
| B32B 27/34 | (2006.01) |
| C08L 25/14 | (2006.01) |
| B32B 23/00 | (2006.01) |

(52) U.S. Cl.
CPC ........... *B32B 25/02* (2013.01); *Y10T 428/1372* (2015.01); *Y10T 428/24942* (2015.01); *B65D 2585/86* (2013.01); *C08L 2205/03* (2013.01); *B32B 27/08* (2013.01); *B32B 27/302* (2013.01); *B32B 2250/24* (2013.01); *B32B 2272/00* (2013.01); *B32B 2307/21* (2013.01); *B32B 2307/412* (2013.01); *B32B 2439/00* (2013.01); *C08L 51/04* (2013.01); *B32B 1/02* (2013.01); *B32B 7/02* (2013.01); *B32B 25/042* (2013.01); *B32B 25/08* (2013.01); *B32B 25/14* (2013.01); *B32B 27/34* (2013.01); *B32B 2250/40* (2013.01); *B32B 2270/00* (2013.01); *B32B 2307/558* (2013.01); *B32B 2553/00* (2013.01); *C08L 25/14* (2013.01)

(58) Field of Classification Search
CPC .................................. B32B 1/02; B32B 1/08
USPC ............ 428/34.1, 34.2, 35.7, 35.9, 36.4, 36.9
See application file for complete search history.

(56) References Cited

U.S. PATENT DOCUMENTS

| 5,990,240 | A | * | 11/1999 | Mishima et al. ................. 525/86 |
| 2005/0124739 | A1 | | 6/2005 | Oda et al. |
| 2009/0104466 | A1 | | 4/2009 | Sumimoto et al. |

FOREIGN PATENT DOCUMENTS

| CN | 1880065 A | 12/2006 |
| JP | A-8-244179 | 9/1996 |
| JP | A-2003-55526 | 2/2003 |
| JP | A-2003-253069 | 9/2003 |
| JP | A-2003-320605 | 11/2003 |
| JP | A-2004-42360 | 2/2004 |
| JP | A-2006-232914 | 9/2006 |
| JP | A-2007-56172 | 3/2007 |
| JP | A-2008-291158 | 12/2008 |
| JP | A-2009-285892 | 12/2009 |

OTHER PUBLICATIONS

Chinese Office Action issued in Chinese Patent Application No. 201280006628.1 on Jul. 30, 2014 (with partial translation).
Mar. 6, 2012 International Search Report issued in International Patent Application No. PCT/JP2012/051499.

* cited by examiner

*Primary Examiner* — Marc Patterson
(74) *Attorney, Agent, or Firm* — Oliff PLC

(57) ABSTRACT

The present invention discloses a laminated sheet for packaging electronic components comprising a front surface layer, a center core layer and a rear surface layer, wherein the front surface layer and the rear surface layer each contains a rubber-modified styrenic copolymer (A) having a graft ratio of grafted rubber of 30 to 50%, a grafted rubber particle diameter of 0.1 to 0.5 μm and a butadiene content of 5 to 25% by weight, and polyetheresteramide (B), and the center core layer contains a rubber-modified styrenic copolymer (C) having a graft ratio of grafted rubber of 70 to 90%, a grafted rubber particle diameter of 0.4 to 1.0 μm, and a butadiene content of 5 to 15% by weight, and 5 to 50% by weight of a recycled material of this laminated sheet.

6 Claims, No Drawings

LAMINATED SHEET FOR PACKAGING ELECTRONIC COMPONENT AND MOLDED BODY THEREOF

TECHNICAL FIELD

The present invention relates to a laminated sheet of a transparent resin for use in electronic component packaging, and an embossed carrier tape etc. formed using the laminated sheet.

BACKGROUND ART

In general, embossed carrier tapes for mounting electronic components such as IC or LSI on electronic equipment are made from sheets that are constituted by a thermoplastic resin, such as a vinyl chloride resin, a styrenic resin or a polycarbonate resin, and thermoformed into an embossed shape. These embossed carrier tapes need measures for preventing electrostatic damage with respect to the above electronic components. For example, non-transparent sheets such as sheets constituted from a resin composition comprising a conductive filler such as carbon black in a thermoplastic resin to achieve a specific surface resistivity of at most $10^8$ Ω/sq. have been used. On the other hand, it is advantageous for embossed carrier tapes for storing electronic components which are less likely to be destroyed by electrostatic damage, e.g., capacitors, to enable visual inspection of the stored electronic components from the outside or detection of the text described on the components. Therefore, transparent type embossed carrier tapes with a substrate made from the above thermoplastic resins with relatively good transparency have been used.

However, due to demands to miniaturize these electronic components or to increase the mounting speed, not only the problem of destruction of components caused by electrostatic damage, but also the problem of poor mounting caused by attachment or transfer of components to carrier tapes because of static has surfaced. Transparent type carrier tapes have also been required to have antistatic properties as antistatic measures.

As the sheets used in transparent type embossed carrier tapes, there are styrenic resin sheets, such as sheets comprising a mixture of a commonly used polystyrene resin and a styrene-butadiene block copolymer (Patent Document 1 etc.) and sheets constituted from a rubber modified styrene polymer comprising a styrenic monomeric unit and a (meth) acrylic acid ester monomeric unit (Patent Document 2 etc.). Carrier tapes are required to maintain a balance of physical properties such as transparency, impact resistance, folding strength and formability based on their state of use. To date, many studies have been made to improve these properties or to obtain a good balance of physical properties. Further, as the technique for providing antistatic properties, for example, coating the surface with an antistatic agent or blending an antistatic agent in the resin has been performed.

However, for a conventional transparent type antistatic sheet, when the antistatic properties were emphasized, the problem of low folding strength of the sheet and easy cracking or splitting of the sheet with respect to the direction of extrusion and the problem of reduced transparency occurred. In particular, while indicators such as haze and total light transmittance have been generally used for transparency, with advances in component miniaturization, even when the haze or total light transmittance value is good, when examining components across the carrier tape, visibility, i.e., distinction of the text etc. described on the components, is sometimes difficult.

Moreover, usually when producing a laminated sheet by co-extrusion forming, portions called "ears" are formed by trimming of the two ends of a die-extruded sheet. Portions that are not made into products, such as the "ears" or the beginning of the sheet during winding, are ground, re-made into pellets and, for example, added to the raw material of a core layer, to be reused as recycled materials in general. When considering the productivity of laminated sheets, even if such a recycled material is added, it is very important for the resulting sheet to have good properties and to enable examination across a carrier tape as described above. However, conventional laminated sheets had problems of markedly reduced transparency and visibility when recycled materials were added.

PATENT DOCUMENTS

Patent Document 1: JP-A 2003-055526
Patent Document 2: JP-A 2003-253069

SUMMARY OF THE INVENTION

The object of the present invention is the obtainment of a transparent type resin sheet for use in the packaging of electronic components, such as an embossed carrier tape, the sheet being a laminated sheet which is superior in antistatic properties, transparency, visibility and balance of physical properties, such as folding strength or impact resistance, and provides a good balance of physical properties, transparency and visibility during examination across a carrier tape even when a recycled material is added to the core layer; and the obtainment of an embossed carrier tape.

As a result of diligent studies of these problems, the present inventors found that there is a strong correlation between the above visibility across a carrier tape and image clarity as defined by JIS K7105, and that a sheet solving all the above problems is obtained by using a specific resin composition to construct each layer of a laminated sheet of a styrene-(meth) acrylic acid ester copolymer comprising a polyether ester amide as an antistatic component in the surface layer, thereby arriving at the present invention.

That is, the first aspect of the present invention provides a laminated sheet, wherein a front surface conductive layer is formed on one surface of a core layer, or a front surface conductive layer is formed on one surface and a back surface conductive layer is formed on the other surface,
wherein the above front surface layer and/or back surface layer comprise a resin composition comprising 75 to 95 mass % of the following component (A), 25 to 5 mass % of component (B); and the above core layer comprises a resin composition comprising 95 to 50 mass % of component (C) and 5 to 50 mass % of a recycled material from the laminated sheet;
wherein components (A), (B) and (C) each have a refractive index difference of at most 0.05.
Component (A): a rubber modified styrenic copolymer comprising a (meth)acrylic acid ester monomer and a styrenic monomer, which comprises 5 to 25 mass % of butadiene, the copolymer comprising a matrix resin (A-1) and a grafted rubber (A-2), wherein the grafted rubber (A-2) has a graft ratio of 30 to 50% and a grafted rubber particle size of 0.1 to 0.5 μm.

Component (B): a polyether ester amide.

Component (C): a rubber modified styrenic copolymer comprising a (meth)acrylic acid ester monomer and a styrenic monomer, which comprises 5 to 15 mass % of butadiene, the copolymer comprising a matrix resin (C-1) and a grafted rubber (C-2), wherein the grafted rubber (C-2) has a graft ratio of 70 to 90% and a grafted rubber particle size of 0.4 to 1.0 μm In a further embodiment, the above component (A) preferably comprises 60 to 90 mass % of the following matrix resin (A-1) and 40 to 10 mass % of grafted rubber (A-2). (A-1): a copolymer with a mass average molecular weight of $5 \times 10^4$ to $1 \times 10^5$, comprising 20 to 70 mass % of a styrenic monomeric unit and 80 to 30 mass % of a (meth)acrylic acid ester monomeric unit.

(A-2): a grafted rubber comprising a polybutadiene and a graft branch of the same composition as (A-1)

In a further embodiment, the above component (C) preferably comprises 50 to 85 mass % of the following matrix resin (C-1) and 50 to 15 mass % of grafted rubber (C-2).

(C-1): a copolymer with a mass average molecular weight of $1 \times 10^5$ to $1.5 \times 10^5$, comprising 30 to 80 mass % of a styrenic monomeric unit, 70 to 20 mass % of a (meth)acrylic acid ester monomeric unit and 0 to 10 mass % of n-butyl acrylate.

(C-2): a grafted rubber comprising a styrene-butadiene block copolymer and a graft branch of the same composition as (C-1).

In yet another aspect of the present invention, a container for packaging electronic components, a carrier tape and a tray for transporting electronic components are provided.

According to the present invention, a laminated sheet having antistatic properties and excellent transparency, visibility and folding strength is obtained. Even when a part of the sheet is used as a recycled material, there is little effect on the visibility and balance of physical properties, and this laminated sheet can be subjected to thermoforming such as pressure forming to produce an article for packaging electronic components having continuous antistatic effects. An example of such an article is an embossed carrier tape.

MODES FOR CARRYING OUT THE INVENTION

Modes for carrying out the present invention shall be explained in details below.

According to one embodiment of the present application, the laminated sheet is constituted by a front surface layer and/or a back surface layer comprising the above components (A) and (B) and a core layer comprising component (C), wherein when film formation is carried out as described below, the portions called the "ears" on the two ends of the laminated sheet or portions, such as the beginning of the sheet during winding, which are not made into products, are ground and remade into pellets, and the pellets are added to component (C) as a raw material for the core layer. Component (A) and component (C) each comprise a resin comprising a matrix resin and a grafted rubber. A grafted rubber is a gel-like substance produced when using a common method to polymerize the above styrenic monomer and (meth)acrylic acid ester monomer in water in which a polybutadiene or styrene-butadiene block copolymer as a rubber component has been dispersed or emulsified during production of the above copolymer compositions. The graft ratio of the grafted rubber is the mass ratio of the graft branch with respect to the rubber component in the grafted rubber. The graft ratio can be adjusted by conditions such as the amount of the monomers added, polymerization temperature and polymerization time during polymerization.

In the present invention, the measurement of the graft ratio and the constitution of each monomer of the matrix resins are values measured by a common method for rubber modified styrenic copolymers comprising a grafted rubber. Moreover, the graft ratio is a value measured as follows. After dissolving the rubber modified styrenic copolymer of component (A) or (C) in toluene, centrifugation was carried out to obtain a precipitate, the precipitate was dried using a vacuum dryer, and the mass of the precipitate was taken as mass X of the grafted rubber. Further, the precipitate was used to obtain mass Y of the styrenic monomer and mass Z of the (meth) acrylic acid ester monomer quantified by pyrolysis gas chromatography to thereby calculate the graft ratio (%) using the equation: graft ratio $(\%) = 100 \times (Y+Z)/\{X-(Y+Z)\}$. On the other hand, the composition of each monomer of the matrix resins was measured as follows. After dissolving the rubber modified styrenic copolymer of component (A) or (C) in toluene, centrifugation is carried out to obtain a precipitate and a supernatant fraction, to which methanol is added to precipitate the styrenic monomer. The precipitate was dried and dissolved in deuterated chloroform to obtain a measurement sample, which was subjected to 13C measurement using FT-NMR (FX-90Q manufactured by JEOL Ltd.) to calculate the constitution ratio of each monomer based on the peak areas of the styrenic monomer and (meth)acrylic acid ester monomer.

Additionally, the resin composition of the core layer was obtained by separating the core layer, dissolving it in deuterated chloroform, carrying out 13C measurement using FT-NMR (FX-90Q manufactured by JEOL Ltd.) and calculating the constitution ratio of each monomer based on the peak areas of the styrenic monomer and (meth)acrylic acid ester monomer. Moreover, the content of the antistatic agent is quantified by pyrolysis gas chromatography of the core layer in the solid state.

According to one embodiment of the present invention, the laminated sheet is constituted by a front surface layer and/or a back surface layer comprising the above components (A) and (B) and a core layer comprising component (C). Component (A) or (C) is produced by general radical polymerization using a styrenic monomer and a (meth)acrylic acid ester monomer of a specific ratio in water in which a polybutadiene or a styrene-butadiene block copolymer as a rubber component has been dispersed or emulsified. When doing so, a part of them bind to the above rubber component as a graft branch to form a grafted rubber. In the present invention, the grafted rubbers in components (A) and (C) are respectively referred to as (A-2) and (C-2). On the other hand, copolymers that do not become graft branches are also generated, and these matrix resins are respectively referred to as (A-1) and (C-1). Additionally, in components (A) and (C) of the resin composition of the present invention, a separate copolymer of only a styrenic monomer and (meth)acrylic acid ester monomer may be added in each of (A-1) and (C-1).

The styrenic monomer in the present invention refers to styrene or a derivative thereof. Examples of the derivatives may include α-methylstyrene, p-methylstyrene, o-methylstyrene, and p-t-butylstyrene. Styrene is preferred. The styrenic monomer may be used alone, or two or more in combination. Additionally, the (meth)acrylic acid ester monomer refers to an acrylic acid ester or methacrylic acid ester derivative, e.g., methyl methacrylate, ethyl methacrylate, methyl acrylate, ethyl acrylate, n-butyl acrylate, 2-methylhexyl acrylate, 2-ethylhexyl acrylate. The (meth)acrylic acid ester monomer may be used alone, or two or more in combination.

As component (B) which is included in the front surface layer and back surface layer, a polyether ester amide may be used when considering that it rarely impairs transparency and provides a continuous antistatic effect when mixed with the above component (A). Moreover, regarding the amount to be added, from the aspects of good transparency and antistatic effect, component (B) is in the range of 25 to 5 mass % with respect to 75 to 95 mass % of component (A). When considering transparency, component (B) preferably has a refractive index close to that of component (A). Further, in cases where the component is to be used as a recycled material, the refractive index is preferably close to that of component (C), and the refractive index difference between components (A), (B) and (C) is more preferably at most 0.05%.

According to one embodiment of the present invention, the total thickness of the laminated sheet is generally 100 to 700 μm, and the thicknesses of the front surface layer and back surface layer are each preferably in the range of 3 to 20% of the total thickness based on the transparency of the sheet and balance of various mechanical properties. Moreover, as described above, the front surface layer and back surface layer comprise a resin composition comprising 75 to 95 mass % of component (A) and 25 to 5 mass % of component (B). When component (B) exceeds 25 mass %, transparency is reduced. When component (B) is less than 5 mass %, antistatic performance is reduced.

Component (A) is a copolymer of a rubber modified styrenic monomer and a (meth)acrylic acid ester monomer, wherein the copolymer of component (A) is a rubber modified styrenic copolymer comprising a (meth)acrylic acid ester monomer and a styrenic monomer, which comprises 5 to 25 mass % of butadiene with respect to 100 mass % of component (A), the copolymer comprising a matrix resin (A-1) and a grafted rubber (A-2), wherein the grafted rubber (A-2) has a graft ratio of 30 to 50% and a grafted rubber particle size of 0.1 to 0.5 μm When the graft ratio of the grafted rubber (A-2) is less than 30%, transparency is reduced. When the graft ratio exceeds 50%, the folding strength along the direction of sheet extrusion (MD) is remarkably reduced (the folding strength of a sample taken in the perpendicular direction (TD)). Moreover, when the grafted rubber particle size exceeds 0.5 μm, shrinkage of the rubber is increased, resulting in a rough surface and great reduction in the visibility of text printed on the stored components across the carrier tape. When the grafted rubber particle size is less than 0.1 μm, the folding strength is remarkably reduced. Moreover, when the butadiene in component (A) is within the range of 5 to 25 mass % as described above, a laminated sheet with good transparency, visibility and balance of properties such as folding strength is obtained. The present inventors found a strong correlation between the above-described "visibility" and "image clarity" as defined by JIS K7105, and evaluated the resin compositions of the front surface layer, back surface layer and core layer. The following evaluation regarding "visibility" is based on an evaluation of "image clarity".

Further, in order for a superior transparency and visibility to manifest, it is preferred that the copolymer of component (A) be a copolymer comprising 60 to 90 mass % of matrix resin (A-1) and 40 to 10 mass % of grafted rubber (A-2), wherein the above matrix resin (A-1) is a copolymer comprising 20 to 70 mass % of a styrenic monomeric unit and 80 to 30 mass % of a (meth)acrylic acid ester monomeric unit, and the above grafted rubber (A-2) comprises a polybutadiene and a graft branch of the same composition as (A-1).

Moreover, the mass average molecular weight (Mw) of component (A-1) is preferably $5 \times 10^4$ to $1 \times 10^5$. In cases where Mw is less than $5 \times 10^4$, the folding strength may be weak, and in cases where Mw exceeds $1 \times 10^5$, the dispersibility in component C may be poor and transparency may be reduced when used as a recycled material.

Additionally, according to one embodiment of the present invention, the resin composition of component (C) constituting the core layer is a rubber modified copolymer comprising a (meth)acrylic acid ester monomer and a styrenic monomer, which comprises 5 to 25 mass % of butadiene when considering the transparency and physical properties such as folding strength of the laminated sheet. It is very important for grafted rubber (C-2) to have a particle size of 0.4 to 1.0 μm and a graft ratio of 70 to 90 mass %. When the particle size of the grafted rubber is less than 0.4 μm, folding strength is weak, and when it exceeds 1.0 transparency is poor. The above-described relatively low graft ratio of grafted rubber (A-2) included in the front surface layer and back surface layer and the high range of graft ratio of grafted rubber (C-2) of the core layer is an important feature of the present invention, which provides a laminated sheet that is superior in both the above folding strength and transparency.

Component (C) preferably comprises 50 to 85 mass % of matrix resin (C-1) and 50 to 15 mass % of grafted rubber (C-2) when considering the balance of folding strength and transparency. Moreover, the mass average molecular weight (Mw) of component (C-1) is preferably $1 \times 10^5$ to $1.5 \times 10^5$. When Mw is less than $1 \times 10^5$, formability or folding strength may be reduced, and it may be difficult to obtain a sheet with good impact strength. Additionally, when Mw exceeds $1.5 \times 10^5$, the dispersibility of the grafted rubber may be reduced, causing a reduction in transparency. Further, grafted rubber (C-2) usually has a graft branch of the same composition as (C-1).

According to one embodiment of the present invention, an additive such as an antioxidant, weathering agent, lubricant, plasticizer, colorant, antistatic agent, mineral oil or flame retardant may be added to the resin constituting the laminated sheet. Further, in order to achieve good surface properties of the sheet, an antistatic agent, silicone or anticlouding agent may be applied to the surface.

There are no particular limitations on the method for producing the laminated sheet of the present invention, and a general method may be used to produce the sheet. For example, the sheet may be suitably produced by extrusion forming using a multilayer T-die having a multimanifold or by T-die extrusion forming using a feed block. Additionally, in the method for producing this type of laminated sheet, the portions called "ears" generated during the sheet extrusion process are generally ground and added to the core layer as a recycled material.

Regarding the amount of the recycled material added to the core layer, the polyether ester amide in component (B), which is a component of the front surface layer and back surface layer, is preferably in the range of up to 3 mass % based on 100 mass % of the entire core layer, and in general, the amount of the recycled material added to the core layer is preferably in the range of 5 to 50 mass % based on 100 mass % of the entire core layer.

The laminated sheet of the present invention can be used to provide a container for packing electronic components of a free shape, such as a carrier tape (embossed carrier tape) or tray by a well-known forming method (thermoforming) such as vacuum forming, pressure forming or press forming. In general, for this type of laminated sheet, when adding the above recycled material to form a film for the sheet, the haze of the sheet or the thermoformed product thereof is remarkably high, or even if the haze is kept low, the image clarity of the sheet is insufficient. Since the laminated sheet of the present invention is a laminated sheet using the above resins as the resins for the front surface layer, back surface layer and core layer, even when a recycled material is added to the core layer, it is possible to produce an embossed carrier tape with good antistatic properties, transparency, visibility, folding strength and impact strength as the thermoformed product of the laminated sheet.

A carrier tape (embossed carrier tape) can be used in the storage and transportation of electronic components as a carrier tape body that, after storing the electronic components in storage portions formed by the above forming method, is covered with a cover tape and wound into the shape of a reel.

A package of electronic components is a body wherein electronic components are stored in a container for packaging electronic components in the packaging form of a carrier tape or tray. The electronic components to be packaged are not particularly limited, and for example, may include IC's, LED's (light emitting diodes), resistors, liquid crystal, capacitors, transistors, piezoelectric element resistors, filters, crystal oscillators, crystal vibrators, diodes, connectors, switches, volumes, relays and inductors. Moreover, the present invention may also be used for packages of intermediate or final products wherein the electronic components are used.

EXAMPLES (Evaluation Method)

The laminated sheets obtained in the examples and comparative examples of the present invention were evaluated using the following methods.

(1) Transparency of Laminated Sheet

Haze and total light transmittance were measured in accordance with JIS K 7105. The haze value was at most 15%.

(2) Visibility of Laminated Sheet

Image clarity was measured in accordance with JIS K 7374. 1 mm was used as the optical comb pitch based on a correlation with visual perception. Image clarity is a value regarding how clearly the image of an object can be seen across plastic, and represents "visibility", which is one of the problems to be solved by the present invention, as a concrete numerical value. The image clarity value is set to at least 88%.

(3) Folding strength

Based on ASTM D2176, 120 mm-long, 15 mm-wide and 0.3 mm-thick test pieces were produced, an MIT folding endurance tester manufactured by Toyo Seiki Seisaku-Sho was used, and the sheets were sampled with MD (the direction in which the sheets were extruded) and TD (the direction perpendicular to the extrusion direction of the sheets) as the length direction to measure MIT folding strength. At that time, tests were performed at a folding angle of 135 degrees, a folding speed of 175 times per minute and a measuring load of 9.8 N. MD is set to at least 100 times and D is set to at least 50 times.

(4) Surface Resistance

Measurements were made in an environment of 23° C.×50% RH in accordance with JIS K 6911.

Additionally, regarding antistatic performance, at a measured surface resistance of $10^{12}$ to $10^{13}$ Ω/sq., hindrance prevention in a stationary condition (prevention of dust adherence) is effective, and at $10^{10}$ to $10^{12}$ Ω/sq., hindrance prevention in a dynamic condition (static prevention when static electricity is generated by friction or the like) is effective.

Examples 1 to 10

The rubber modified styrenic copolymers of component (A) shown in Table 1 (resin 1, resin 2 and resin 11) were mixed with polyether ester amide, the antistatic agent of component (B) (PELESTAT NC6321/Sanyo Chemical Industries) at the proportions shown in Table 2 to form the resin compositions for the front surface layers and back surface layers, and the rubber modified styrenic copolymers of component (C) (resin 3, resin 4 and resin 12) were mixed with the recycled material to form the core layers. A multimanifold method using one φ 65 mm extruder (L/D=32), two φ 40 mm extruders (L/D=26) and 600 mm-wide T-die was used to obtain two-type, three-layered laminated sheets with a front surface layer/core layer/back surface layer of 5/90/5 and an average thickness of 300 μm. The evaluation results are shown in Table 3.

TABLE 1

| Resin | St mass % | MMA mass % | nBA mass % | Bd mass % | Refractive Index | Grafted rubber (A-2 or C-2) | | | Matrix Resin (A-1 or C-1) | | |
|---|---|---|---|---|---|---|---|---|---|---|---|
| | | | | | | Proportion in Component A or C mass % | Graft Ratio mass % | Particle size μm | Proportion in Component A or C mass % | Styrenic monomer Proportion mass % | Mw × $10^4$ |
| Resin 1 | 18 | 61 | 0 | 21 | 1.514 | 36 | 45 | 0.3 | 64 | 18 | 5.9 |
| Resin 2 | 20 | 69 | 0 | 11 | 1.514 | 18 | 45 | 0.3 | 82 | 20 | 5.6 |
| Resin 3 | 53 | 33 | 6 | 8 | 1.555 | 32 | 75 | 0.6 | 68 | 54 | 14.1 |
| Resin 4 | 52 | 32 | 6 | 10 | 1.555 | 50 | 80 | 0.6 | 50 | 54 | 11.8 |
| Resin 5 | 21.5 | 76 | 0 | 2.5 | 1.513 | 4 | 43 | 0.3 | 96 | 21.5 | 6.9 |
| Resin 6 | 15 | 58 | 0 | 27 | 1.512 | 45 | 46 | 0.3 | 55 | 15 | 7.1 |
| Resin 7 | 16 | 66 | 0 | 18 | 1.510 | 30 | 20 | 0.3 | 70 | 16 | 7.2 |
| Resin 8 | 56 | 35 | 6 | 3 | 1.555 | 12 | 75 | 0.6 | 97 | 57 | 13.6 |
| Resin 9 | 62 | 12 | 6 | 20 | 1.578 | 80 | 75 | 0.6 | 20 | 73 | 14.1 |
| Resin 10 | 53 | 33 | 6 | 8 | 1.555 | 20 | 60 | 0.6 | 80 | 55 | 11.2 |
| Resin 11 | 19 | 60 | 0 | 21 | 1.515 | 36 | 48 | 0.3 | 64 | 20 | 9.2 |
| Resin 12 | 53 | 33 | 6 | 8 | 1.555 | 32 | 75 | 0.6 | 68 | 54 | 11.5 |
| Resin 13 | 23 | 63 | 0 | 14 | 1.518 | 18 | 46 | 0.3 | 82 | 20 | 11.8 |
| Resin 14 | 18 | 58 | 0 | 24 | 1.515 | 18 | 42 | 0.3 | 82 | 20 | 4.2 |
| Resin 15 | 50 | 36 | 6 | 8 | 1.551 | 32 | 75 | 0.6 | 68 | 54 | 8.9 |
| Resin 16 | 52 | 34 | 6 | 8 | 1.553 | 32 | 75 | 0.6 | 68 | 54 | 16.6 |

TABLE 2

| | Front and Back Surface Layers | | | Core Layer | | | Proportions of Monomers and Antistatic Agent in Core Layer | | | | | |
|---|---|---|---|---|---|---|---|---|---|---|---|---|
| | component (A) | component (A) mass % | component (B) mass % | component (C) | component (C) mass % | recycled material mass % | St mass % | MMA mass % | nBA mass % | Bd mass % | antistatic agent mass % | Refractive Index Difference |
| Ex. 1 | Resin 1 | 85 | 15 | Resin 3 | 85 | 15 | 52.4 | 33.3 | 5.9 | 8.1 | 0.23 | 0.04 |
| Ex. 2 | Resin 1 | 85 | 15 | Resin 3 | 75 | 25 | 52.1 | 33.5 | 5.9 | 8.2 | 0.38 | 0.04 |
| Ex. 3 | Resin 1 | 85 | 15 | Resin 3 | 55 | 45 | 51.3 | 33.8 | 5.7 | 8.4 | 0.68 | 0.04 |
| Ex. 4 | Resin 1 | 80 | 20 | Resin 3 | 85 | 15 | 52.4 | 33.2 | 5.9 | 8.1 | 0.30 | 0.04 |
| Ex. 5 | Resin 1 | 91 | 9 | Resin 3 | 85 | 15 | 52.5 | 33.3 | 5.9 | 8.2 | 0.14 | 0.04 |
| Ex. 6 | Resin 2 | 85 | 15 | Resin 3 | 85 | 15 | 52.5 | 33.4 | 5.9 | 8.0 | 0.23 | 0.03 |
| Ex. 7 | Resin 1 | 85 | 15 | Resin 4 | 85 | 15 | 51.4 | 32.3 | 5.9 | 10.1 | 0.23 | 0.03 |
| Ex. 8 | Resin 2 | 85 | 15 | Resin 4 | 85 | 15 | 51.5 | 32.4 | 5.9 | 10.0 | 0.23 | 0.03 |
| Ex. 9 | Resin 11 | 85 | 15 | Resin 3 | 85 | 15 | 52.4 | 33.3 | 5.9 | 8.1 | 0.23 | 0.02 |
| Ex. 10 | Resin 1 | 85 | 15 | Resin 12 | 85 | 15 | 52.4 | 33.3 | 5.9 | 8.1 | 0.23 | 0.04 |

TABLE 3

| | Folding Strength (times) | | Haze | Total Light Transmittance | Image clarity | Surface Resistance |
|---|---|---|---|---|---|---|
| | MD | TD | (%) | (%) | (%) | (Ω/sq.) |
| Ex. 1 | 216 | 72 | 7.8 | 89.1 | 91.3 | 7.1E+10 |
| Ex. 2 | 205 | 68 | 11.2 | 86.0 | 90.6 | 7.5E+10 |
| Ex. 3 | 211 | 65 | 14.8 | 80.0 | 89.2 | 7.1E+10 |
| Ex. 4 | 250 | 69 | 11.9 | 80.0 | 92.3 | 2.1E+10 |
| Ex. 5 | 235 | 65 | 9.1 | 88.0 | 91.5 | 5.6E+11 |
| Ex. 6 | 150 | 50 | 10.9 | 84.0 | 90.9 | 7.3E+10 |
| Ex. 7 | 587 | 172 | 11.5 | 85.0 | 88.7 | 6.5E+10 |
| Ex. 8 | 168 | 61 | 10.2 | 84.5 | 90.1 | 7.8E+10 |
| Ex. 9 | 312 | 89 | 9.7 | 83.0 | 91.1 | 8.1E+10 |
| Ex. 10 | 187 | 51 | 10.4 | 87.1 | 90.7 | 6.2E+10 |

Comparative Examples 1-14

Other than mixing the above components (A), (C) and (B) according to the proportions shown in Table 4 to obtain the compounds of respective resin compositions, two-type three-layered laminated sheets were obtained in the same manner as Examples 1-10. The evaluation results are shown in Table 5.

| | Front and Back Surface Layers | | | Core Layer | | | Proportions of Monomers and Antistatic Agent in Core Layer | | | | | |
|---|---|---|---|---|---|---|---|---|---|---|---|---|
| | component (A) | component (A) mass % | component (B) mass % | component (C) | component (C) mass % | recycled material mass % | St mass % | MMA mass % | nBA mass % | Bd mass % | antistatic agent mass % | Refractive Index Difference |
| Comp. Ex. 1 | Resin 1 | 85 | 15 | Resin 3 | 40 | 60 | 50.7 | 34.1 | 5.6 | 8.6 | 0.90 | 0.04 |
| Comp. Ex. 2 | Resin 5 | 85 | 15 | Resin 3 | 85 | 15 | 52.5 | 33.5 | 5.9 | 7.9 | 0.23 | 0.04 |
| Comp. Ex. 3 | Resin 6 | 75 | 25 | Resin 3 | 85 | 15 | 52.4 | 33.2 | 5.9 | 8.2 | 0.38 | 0.04 |
| Comp. Ex. 4 | Resin 7 | 90 | 10 | Resin 3 | 85 | 15 | 52.4 | 33.4 | 5.9 | 8.1 | 0.15 | 0.04 |
| Comp. Ex. 5 | Resin 1 | 85 | 15 | Resin 8 | 85 | 15 | 55.4 | 35.3 | 5.9 | 3.2 | 0.23 | 0.04 |
| Comp. Ex. 6 | Resin 1 | 75 | 25 | Resin 9 | 85 | 15 | 61.3 | 12.5 | 5.9 | 19.9 | 0.38 | 0.06 |
| Comp. Ex. 7 | Resin 2 | 75 | 25 | Resin 10 | 85 | 15 | 52.4 | 33.3 | 5.9 | 8.0 | 0.38 | 0.04 |
| Comp. Ex. 8 | Resin 1 | 97 | 3 | Resin 10 | 85 | 15 | 52.5 | 33.4 | 5.9 | 8.2 | 0.05 | 0.04 |
| Comp. Ex. 9 | Resin 1 | 85 | 15 | Resin 1 | 85 | 15 | 19.0 | 60.0 | 0.0 | 20.8 | 0.23 | 0.00 |
| Comp. Ex. 10 | Resin 3 | 85 | 15 | Resin 3 | 85 | 15 | 52.9 | 32.9 | 6.0 | 8.0 | 0.23 | 0.04 |
| Comp. Ex. 11 | Resin 13 | 85 | 15 | Resin 3 | 55 | 45 | 51.5 | 33.9 | 5.7 | 8.2 | 0.68 | 0.04 |
| Comp. Ex. 12 | Resin 14 | 85 | 15 | Resin 3 | 55 | 45 | 51.3 | 33.7 | 5.7 | 8.6 | 0.68 | 0.00 |
| Comp. Ex. 13 | Resin 1 | 85 | 15 | Resin 15 | 55 | 45 | 48.4 | 36.7 | 5.7 | 8.4 | 0.68 | 0.04 |
| Comp. Ex. 14 | Resin 1 | 85 | 15 | Resin 16 | 55 | 45 | 50.3 | 34.8 | 5.7 | 8.4 | 0.68 | 0.04 |

TABLE 5

| | Folding Strength (times) | | Haze (%) | Total Light Trans- mittance (%) | Image clarity | Surface Resistance (Ω/sq.) |
|---|---|---|---|---|---|---|
| | MD | TD | | | | |
| Comp. Ex. 1 | 242 | 83 | 28 | 79.0 | 86 | 7.50E+10 |
| Comp. Ex. 2 | 82 | 25 | 7.8 | 86.0 | 94.2 | 7.50E+10 |
| Comp. Ex. 3 | 450 | 75 | 20.0 | 70.0 | 61.3 | 8.80E+09 |
| Comp. Ex. 4 | 88 | 30 | 21.3 | 88.0 | 73.0 | 2.10E+12 |
| Comp. Ex. 5 | 50 | 22 | 7.9 | 84.0 | 94.1 | 6.80E+10 |
| Comp. Ex. 6 | 750 | 110 | 16.9 | 71.0 | 85.3 | 7.70E+09 |
| Comp. Ex. 7 | 750 | 110 | 30.5 | 64.1 | 49.3 | 7.70E+09 |
| Comp. Ex. 8 | 225 | 48 | 3.2 | 87.0 | 97.1 | 3.30E+12 |
| Comp. Ex. 9 | 880 | 10 | 8.4 | 88.0 | 92.3 | 7.70E+10 |
| Comp. Ex. 10 | 201 | 85 | 16.0 | 62.0 | 12.8 | 6.80E+10 |
| Comp. Ex. 11 | 351 | 83 | 19.3 | 79.0 | 78 | 5.10E+10 |
| Comp. Ex. 12 | 40 | 11 | 12.1 | 87.0 | 92.1 | 7.80E+10 |
| Comp. Ex. 13 | 130 | 31 | 13.1 | 85.1 | 89 | 7.50E+10 |
| Comp. Ex. 14 | 441 | 101 | 17.1 | 81.0 | 85.0 | 6.50E+10 |

The present invention was explained using embodiments above. However, it goes without saying that the technical scope of the present invention is not limited by the scope described in the above embodiments. Those skilled in the art would dearly understand that various modifications or improvements can be added to the above embodiments. Moreover, it is clear from the recitations of the claims that embodiments with such modifications or improvements may also be included in the technical scope of the present invention.

INDUSTRIAL APPLICABILITY

From the laminated sheet of the present invention, a container for packing electronic components of a free shape, such as a carrier tape (embossed carrier tape) or tray may be obtained by a well-known forming method (thermoforming) such as vacuum forming, pressure forming or press forming. According to the laminated sheet of the present invention, even if a recycled material is added to the core layer, it is possible to produce a transparent type embossed carrier tape with good antistatic properties, transparency, visibility, folding strength and impact resistance as the thermoformed product of the laminated sheet.

The invention claimed is:

1. A laminated sheet comprising a front surface layer, a core layer and a back surface layer,
    wherein said front surface layer and said back surface layer comprise a resin composition comprising 75 to 95 mass % of a component (A) and 25 to 5 mass % of a component (B), and said core layer comprises a resin composition comprising 95 to 50 mass % of a component (C) and 5 to 50 mass % of a recycled material from the laminated sheet,
    wherein components (A), (B) and (C) each have a refractive index difference of at most 0.05;
    wherein component (A) is a rubber modified styrenic copolymer comprising a (meth)acrylic acid ester monomer and a styrenic monomer, which comprises 5 to 25 mass % of butadiene, the copolymer comprising a matrix resin (A-1) and a grafted rubber (A-2), wherein the grafted rubber (A-2) has a graft ratio of 30 to 50% and a grafted rubber particle size of 0.1 to 0.5μm;
    wherein component (B) is a polyether ester amide;
    wherein component (C) is a rubber modified styrenic copolymer comprising a (meth)acrylic acid ester monomer and a styrenic monomer, which comprises 5 to 15 mass % of butadiene, the copolymer comprising a matrix resin (C-1) and a grafted rubber (C-2), wherein the grafted rubber (C-2) has a graft ratio of 70 to 90% and a grafted rubber particle size of 0.4 to 1.0 μm.

2. The laminated sheet according to claim 1, wherein said component (A) comprises 60 to 90 mass % of the following matrix resin (A-1) and 40 to 10 mass % of the following grafted rubber (A-2),
    wherein (A-1) is a copolymer with a mass average molecular weight of $5 \times 10^4$ to $1 \times 10^5$, comprising 20 to 70 mass % of a styrenic monomeric unit and 80 to 30 mass % of a (meth)acrylic acid ester monomeric unit;
    wherein (A-2) is a grafted rubber comprising a polybutadiene and a graft branch of the same composition as (A-1).

3. The laminated sheet according to claim 1, wherein said component (C) comprises 50 to 85 mass % of the following matrix resin (C-1) and 50 to 15 mass % of the following grafted rubber (C-2),
    wherein (C-1) is a copolymer with a mass average molecular weight of $1 \times 10^5$ to $1.5 \times 10^5$, comprising 30 to 80 mass % of a styrenic monomeric unit, 70 to 20 mass % of a (meth)acrylic acid ester monomeric unit and 0 to 10 mass % of n-butyl acrylate;
    wherein (C-2) is a grafted rubber comprising a styrene-butadiene block copolymer and a graft branch of the same composition as (C-1).

4. A container for packaging electronic components, wherein the sheet according to claim 1 is used.

5. A carrier tape, wherein the sheet according to claim 1 is used.

6. A tray for transporting electronic components, wherein the sheet according to claim 1 is used.

* * * * *